(12) United States Patent
Davidkov et al.

(10) Patent No.: US 11,879,167 B2
(45) Date of Patent: Jan. 23, 2024

(54) CLAD 2XXX-SERIES AEROSPACE PRODUCT

(71) Applicant: Aleris Rolled Products Germany GmbH, Koblenz (DE)

(72) Inventors: Aleksandar Lozanov Davidkov, Aachen (DE); Achim Bürger, Höhr-Grenzhausen (DE); Sabine Maria Spangel, Koblenz (DE); Philippe Meyer, Agnetz (FR)

(73) Assignee: Novelis Koblenz GmbH, Koblenz (DE)

( * ) Notice: Subject to any disclaimer, the term of this patent is extended or adjusted under 35 U.S.C. 154(b) by 0 days.

(21) Appl. No.: 17/753,079

(22) PCT Filed: Jul. 27, 2020

(86) PCT No.: PCT/IB2020/057081
§ 371 (c)(1),
(2) Date: Feb. 17, 2022

(87) PCT Pub. No.: WO2021/033050
PCT Pub. Date: Feb. 25, 2021

(65) Prior Publication Data
US 2022/0325388 A1 Oct. 13, 2022

(30) Foreign Application Priority Data

Aug. 22, 2019 (EP) ..................... 19193108

(51) Int. Cl.
*B32B 15/01* (2006.01)
*C22C 21/18* (2006.01)
(Continued)

(52) U.S. Cl.
CPC ............ *C22C 21/18* (2013.01); *B32B 15/016* (2013.01); *C22C 21/14* (2013.01); *C22C 21/16* (2013.01); *C22F 1/057* (2013.01)

(58) Field of Classification Search
None
See application file for complete search history.

(56) References Cited

U.S. PATENT DOCUMENTS

2008/0210349 A1* 9/2008 Khosla ................... C22C 21/16
148/552
2014/0366999 A1 12/2014 Kamat et al.

FOREIGN PATENT DOCUMENTS

EP 0623462 A1 11/1994
EP 2038447 3/2009
(Continued)

OTHER PUBLICATIONS

European Application No. 20747145.9, "Office Action", dated Feb. 2, 2023, 3 pages.
(Continued)

*Primary Examiner* — Daniel J. Schleis
(74) *Attorney, Agent, or Firm* — Kilpatrick Townsend & Stockton LIP

(57) ABSTRACT

The invention relates to a rolled composite aerospace product comprising a 2XXX-series core layer and a 6XXX-series aluminium alloy clad layer coupled to at least one surface of the 2XXX-series core layer, wherein the 6XXX-series aluminium alloy comprises, in wt. %, Si 0.3% to 1.0%, Mg 0.3% to 1.1%, Mn 0.04% to 1.0%, Fe 0.03% to 0.4%, Cu up to 0.10%, Cr up to 0.25%, V up to 0.2%, Zr up to 0.2%, Zn up to 0.5%, Ti up to 0.15%, unavoidable impurities each <0.05%, total <0.15%, balance aluminium. The invention further relates to a method of manufacturing such a rolled composite aerospace product.

18 Claims, 2 Drawing Sheets

(51) Int. Cl.
  *C22C 21/14* (2006.01)
  *C22C 21/16* (2006.01)
  *C22F 1/057* (2006.01)

(56) References Cited

FOREIGN PATENT DOCUMENTS

| EP | 2121997 | | 11/2009 |
|---|---|---|---|
| FR | 2704557 | | 11/1994 |
| JP | 2002053925 | A | 2/2002 |
| JP | 2006278243 | A | 10/2006 |
| JP | 2006527303 | A | 11/2006 |
| JP | 2009535508 | A | 10/2009 |
| JP | 2017186615 | A | 10/2017 |
| JP | 2018534419 | A | 11/2018 |
| KR | 20090013772 | A | 2/2009 |
| KR | 20170106613 | A | 9/2017 |
| RU | 2388583 | C2 | 5/2010 |
| RU | 2672652 | C1 | 11/2018 |
| WO | 2013065760 | A1 | 5/2013 |
| WO | 2017183965 | | 10/2017 |

OTHER PUBLICATIONS

Japanese Application No. 2022-511388, "Office Action", dated Feb. 21, 2023, 11 pages.
"Aluminium and Aluminium Alloys—Wrought products—Temper designations", European Committee for Standardization, Final Draft EN 515, Jun. 1, 1993, pp. 1-20.
"Federal Specification Sheet—aluminum alloy Alclad 2014,", plate and sheet—QQ-A-250/3F, Sep. 21, 1978, 10 pages.
"International Alloy Designations and Chemical Composition Limits for Wrought Aluminum and Wrought Aluminum Alloy", The Aluminium Association, 2006.
"International Alloy Designations and Chemical Composition Limits for Wrought Aluminum and Wrought Aluminum Alloys", The Aluminum Association, XP003023672, Apr. 1, 2004, pp. 1-35.
European Application No. 19193108.8, Extended European Search Report, dated Mar. 23, 2020, 6 pages.
International Application No. PCT/IB2020/057081, International Search Report and Written Opinion, dated Oct. 26, 2020, 11 pages.
International Application No. PCT/IB2020/057081, Third Party Observation, Oct. 15, 2021, 3 pages.
Canadian Application No. 3146405, "Office Action", dated Nov. 25, 2022, 3 pages.
Russian Application No. 2022102903, "Notice of Decision to Grant", dated Sep. 23, 2022, 19 pages.
European Application No. 19193108.8, Notice of Decision to Grant, dated Jul. 14, 2022, 2 pages.
Indian Application No. 202217008868, "First Examination Report", dated Apr. 29, 2022, 5 pages.
European Application No. 20747145.9, "Intention to Grant", dated Jun. 15, 2023, 8 pages.
Canadian Application No. 3,146,405, "Office Action", dated Nov. 2, 2023, 3 pages.
Japanese Application No. 2022-511388, "Office Action", dated Aug. 29, 2023, 6 pages.
South African Application No. 2022/01833, "Notice of Allowance", dated Oct. 24, 2023, 1 page.

\* cited by examiner

CLAD 2XXX-SERIES AEROSPACE PRODUCT

CROSS-REFERENCE TO RELATED APPLICATION

This application claims the benefit of and priority to European Patent Application No. 19193108.8 filed Aug. 22, 2019 and titled "CLAD 2XXX-SERIES AEROSPACE PRODUCT," the content of which is herein incorporated by reference in its entirety.

FIELD OF THE INVENTION

The invention relates to a rolled composite aerospace product comprising a 2XXX-series core layer and an aluminium alloy layer coupled to at least one surface of the 2XXX-series core layer. The rolled composite product is ideally suitable for structural aerospace parts. The invention further relates to a method of manufacturing a rolled composite aerospace product.

BACKGROUND OF THE INVENTION

In the aerospace industry the AA2024-series aluminium alloy and modifications thereof are widely used as a high damage tolerant aluminium alloy, mostly in a T3 condition or modifications thereof. Products of these aluminium alloys have a relatively high strength to weight ratio and exhibit good fracture toughness, good fatigue properties, and adequate corrosion resistance.

Already for many decades to enhance the corrosion resistance the AA2024-series alloy product may be provided as a composite product with on one or both sides a relative thin cladding layer. The cladding layer is usually of higher purity which corrosion protects the AA2024 core alloy. The cladding includes essentially unalloyed aluminium. Often reference is made to 1XXX-series aluminium alloys in general, and which include the sub-classes of the 1000-type, 1100-type, 1200-type and 1300-type. In practice, however, the 1XXX-series aluminium alloy used for the cladding layer is rather very pure and has a composition of, Si+Fe<0.7%, Cu<0.10%, Mn<0.05%, Mg<0.05%, Zn<0.10%, Ti<0.03%, and balance aluminium.

The AA2024-series aluminium alloy clad with a 1XXX-series alloy may also be anodized. Anodizing increases resistance to corrosion and wear and provides better adhesion for paint primers and adhesives than does bare metal. Anodized articles are applied in structural adhesive metal bonding such as in skin panels of a wing, horizontal tail plane, vertical tail plane or a fuselage. A further known application comprises a sandwich structure, wherein one or more (glass) fibre reinforced layers are interposed between aluminium panels or sheets using adhesive bonding resulting in a so-called fibre metal laminate. Patent document WO-2017/183965-A1 (Fokker) discloses a method of anodizing an aluminium alloy for applying a porous anodic oxide coating in preparation of the subsequent application of an adhesive bonding layer and/or a primer layer.

A disadvantage of the 1XXX-series alloy as clad layer is that these alloys are very soft and sensitive to surface damage during handling of the product. And also during a forming operation this may lead to for example die-sticking.

DESCRIPTION OF THE INVENTION

As will be appreciated herein below, except as otherwise indicated, aluminium alloy and temper designations refer to the Aluminium Association designations in Aluminum Standards and Data and the Registration Records, as published by the Aluminium Association in 2018 and are well known to the persons skilled in the art. The temper designations are laid down also in European standard EN515.

For any description of alloy compositions or preferred alloy compositions, all references to percentages are by weight percent unless otherwise indicated.

The term "up to" and "up to about", as employed herein, explicitly includes, but is not limited to, the possibility of zero weight-percent of the particular alloying component to which it refers. For example, up to 0.20% Zn may include an aluminium alloy having no Zn.

For the purpose of this invention a sheet product or a sheet material is to be understood as a rolled product having a thickness of not less than 1.3 mm (0.05 inches) and not more than 6.3 mm (0.25 inches), and plate material or a plate product is to be understood as a rolled product having a thickness of more than 6.3 mm (0.25 inches). See also Aluminium Standard and Data, the Aluminium Association, Chapter 5 Terminology, 1997.

It is an object of the invention to provide a clad rolled aerospace product comprising a 2XXX-series alloy and offering an improved balance of corrosion resistance and formability.

This and other objects and further advantages are met or exceeded by the present invention providing a rolled composite aerospace product comprising a 2XXX-series core layer, wherein the core layer has two faces, and a 6XXX-series aluminium alloy clad layer coupled to at least one surface of the 2XXX-series core layer, and wherein the 6XXX-series aluminium alloy comprises, in wt. %, Si 0.3% to 1.0%,
Mg 0.3% to 1.1%,
Mn 0.04% to 1.0%,
Fe 0.03% to 0.4%,
Cu up to 0.10%,
Cr up to 0.25%,
V up to 0.2%,
Zr up to 0.2%,
Zn up to 0.5%,
Ti up to 0.15%,
unavoidable impurities each <0.05%, total <0.15%, balance aluminium.

The 6XXX-series alloy has very good formability characteristics, in particular bendability and stretch formability, such that the rolled composite aerospace product can be formed in forming operations requiring a high degree of deformation. The formability characteristics are comparable to those of several automotive sheet aluminium alloys. The die-sticking of the clad layer to a forming die is significantly reduced or even avoided due to the increased hardness of the cladding layer compared to a 1XXX-series clad layer. The 6XXX-series alloy has a very good surface quality, also after forming into a predetermined shaped product. The absence of surface cracks avoids the pick-up into the surface of any forming lubricants. The absence of surface cracks also significantly increases the fatigue performance of the rolled composite aerospace product. Also, the very good resistance against pitting corrosion improves the fatigue performance as fatigue is common triggered by pitting initiation sites. The 6XXX-series alloy has a significantly higher strength than 1XXX-series alloys resulting in a harder surface and corresponding less surface damages like scratches during product handling. The 6XXX-series alloy is significantly stronger than 1XXX-series alloys such that the overall strength of the composite aerospace product is increased compared a 1XXX-series alloy of the same clad layer thickness. This allows also for the design of rolled composite aerospace products having a thinner clad thickness while resulting in weight savings and still providing the required good corrosion resistance and improved formability characteristics. The 6XXX-series alloy is very good anodizable such that there are no issues with the subsequent application of an adhesive bonding layer and/or a primer layer.

In an embodiment the 6XXX-series aluminium alloy clad layer achieves a hardness of at least 55 HB when brought to a T4 temper. In an embodiment the 6XXX-series aluminium alloy clad layer achieves a hardness of at least 60 HB, and preferably of at least 65 HB, when brought to a T4 temper.

In an embodiment the 6XXX-series aluminium alloy clad layer is bonded to the core layer by means of roll bonding, and preferably by means of hot rolling, to achieve the required metallurgical bonding between the layers. Such a roll bonding process is very economical and results in a very effective composite product presenting the desired properties. When carrying out such a roll-bonding process for producing the rolled composite product according to the invention, it is preferred that both the core layer and the 6XXX-series aluminium alloy clad layer(s) experience a thickness reduction during the roll bonding. Typically, prior to rolling, in particular prior to hot rolling, the rolling faces of ingots of both the core layer and the clad layer(s) are scalped in order to remove segregation zones near the as-cast surface of the rolling ingot and to increase product flatness.

Preferably a cast ingot or slab of the 2XXX alloy core layer is homogenized prior to hot rolling and/or it may be preheated followed directly by hot rolling. The homogenisation and/or preheating of 2XXX-series alloys prior to hot rolling is usually carried out at a temperature in the range 400° C. to 505° C. The segregation of alloying elements in the material as-cast is reduced and soluble elements are dissolved. If the treatment is carried out below about 400° C., the resultant homogenisation effect is inadequate. If the temperature is above about 505° C., eutectic melting might occur resulting in undesirable pore formation. The preferred time of this heat treatment is between 2 and 30 hours. Longer times are not normally detrimental. Homogenisation is usually performed at a temperature above about 480° C. A typical preheat temperature is in the range of about 430° C. to 460° C. with a soaking time in a range of up to about 15 hours. Homogenization may be carried out in one stage or several stages of increasing temperature, in order to avoid incipient melting.

In an embodiment of the invention the cast ingot or slab forming the 6XXX-series aluminium alloy clad liner has been homogenized prior to hot rolling to thinner gauge forming a suitable clad liner for rolling together with the 2XXX-series alloy core alloy to the desired gauge. The rolling faces of the 6XXX-series alloy ingot or slab may be scalped to remove segregation zones near the as-cast surface of the rolling ingot and to increase product flatness. The homogenisation results in a finer and more homogeneous grain structure and results in an increased formability of the alloy layer in the final rolled composite aerospace product. It will dissolve most of the coarse phases and it will complete the beta to alpha-AlFeSi transformation improving the anodization behaviour of the 6XXX-series alloy. The homogenisation heat-treatment is preferably carried out at a temperature of at least 480° C. for at least about 0.5 hour, preferably in a range of about 1 to 30 hours, typically for about 6 to 20 hours. Preferably the homogenisation temperature is in a range of about 500° C. to 590° C., preferably at a temperature in a range of 510° C. to 580° C. In an embodiment the homogenization is carried out at a temperature of at most 570° C. As known in the art, homogenization may be carried out in one stage or several stages of increasing temperature, in order to avoid incipient melting.

The rolled composite aerospace product is down-gauged to final gauge by means of hot rolling and optionally followed by cold rolling as is regular in the art. After the rolled composite product is rolled to final gauge the product is typically solution heat treated (SHT) at a temperature in the range of about 450° C. to 505° C. for a time sufficient for solution effects to approach equilibrium, with typical soaking times in the range of 5 to 120 minutes. Preferably the solution heat-treatment (SHT) is at a temperature in the range of 475° C. to 500° C., for example at about 495° C. The solution heat-treatment is typically carried out in a batch furnace or in a continuous furnace. Preferred soaking times at the indicated temperature is in the range of about 5 to 35 minutes. However, with clad products, care should be taken against too long soaking times since in particular too much copper from the 2XXX core layer may diffuse into the 6XXX-series aluminium alloy clad layer(s) which can detrimentally affect the corrosion protection afforded by said layer(s). After solution heat treatment (SHT), it is important that the rolled composite product is cooled sufficiently fast to a temperature of 175° C. or lower, preferably to 100° C. or lower, and more preferably to ambient temperature, to prevent or minimize the uncontrolled precipitation of secondary phases, e. g. $Al_2CuMg$ and $Al_2Cu$, in the 2XXX core alloy. On the other hand cooling rates should not be too high in order to allow for a sufficient flatness and low level of residual stresses in the rolled composite product. Suitable cooling rates can be achieved with the use of water, e. g. water immersion or water jets. The solution heat-treatment in this temperature range results in a recrystallized microstructure of the 6XXX-series alloy layer. With the 6XXX-series aluminium alloy used in accordance with this invention it will have a minimal fraction of undissolved coarse $Mg_2Si$ and Si particles after the applied SHT, in particular at 475° C. to 500° C., e.g. at about 495° C., with the resulting positive effects on strength, formability and corrosion resistance of the 6XXX-series aluminium alloy clad layer. The evolution of the microstructure at ambient (room) temperature brings the 6XXX-series aluminium alloy layer from a W (as-quenched) to a T4 condition. In this condition the 6XXX-series aluminium alloy clad layer provides enhanced formability compared to a non-recrystallized condition.

The composite product may be further cold worked, for example, by stretching up in the range of 0.5% to 8% of its original length in order relieve residual stresses therein and to improve the flatness of the product. Preferably the stretching up is in the range of 0.5% to 6%, more preferably of 0.5% to 4% and most preferably of 0.5% to 3%.

After cooling the rolled composite aerospace product is naturally aged, typically at ambient temperatures, and alternatively the composite aerospace product can also be artificially aged.

The 6XXX-series aluminium alloy layer or layers are usually much thinner than the core, each 6XXX-series aluminium alloy layer constituting 1% to 20% of the total composite thickness. A 6XXX-series aluminium alloy layer more preferably constitutes around 1% to 10% of the total composite thickness.

In an embodiment the 6XXX-series aluminium alloy layer is bonded on one surface or face of the 2XXX-series core layer.

In an embodiment the 6XXX-series aluminium alloy layer is bonded on both surfaces or faces of the 2XXX-series core layer thereby forming an outer surface of the rolled composite aerospace product.

In an embodiment the rolled composite aerospace product has a total thickness of at least 0.8 mm.

In an embodiment the rolled composite aerospace product has a total thickness of at most 50.8 mm (2 inches), and preferably of at most 25.4 mm (1 inch), and most preferably of at most 12 mm.

In an embodiment the rolled composite aerospace product is a plate product.

In an embodiment the rolled composite aerospace product is a sheet product.

The 6xxx-series aluminium alloy clad layer is from an aluminium alloy having a composition comprising, in wt. %: Si 0.3% to 1.0%, Mg 0.3% to 1.1%, Mn 0.04% to 1.0%, Fe 0.03% to 0.4%, Cu up to 0.10%, Cr up to 0.25%, V up to 0.2%, Zr up to 0.2%, Zn up to 0.5%, Ti up to 0.15%, unavoidable impurities each <0.05%, total <0.15%, balance aluminium.

The Si and Mg are the most important alloying elements of the 6XXX-series alloy and provide the required level of strength and formability, in particular stretch formability, to the aluminium. The Si-content should be in a range of 0.3% to 1.0%. A preferred lower-limit for the Si content is 0.40%. A preferred upper-limit for the Si content is 0.9%, and more preferably 0.75%. The Mg-content should be in a range of 0.3% to 1.1%. A preferred lower-limit for the Mg-content is 0.40%, and more preferably 0.45%. A preferred upper-limit for the Mg-content is 0.90%, and more preferably 0.80%. These Si and Mg ranges together with the other alloying elements will provide a yield strength in a range of about 110 to 125 MPa after about 1 month of natural ageing following the SHT and rapid cooling and will further only gradually increase with prolonged natural ageing leading to a very stable set of strength levels in a T4 condition. Preferably the 6XXX-series alloy has Si in excess of Mg as this will provide improved ageing kinetics and a formation of refined $Mg_2Si$ precipitation structure. This will provide higher strength levels upon ageing, both following artificial ageing and also in particular in the first month of natural ageing following a solution heat-treatment at e.g. 475° C.-500° C. and rapid cooling.

Mn is also an important alloying element of the 6XXX-series alloy used for the clad layer(s) and should be in a range of 0.04% to 1.0%. A preferred lower-limit for the Mn-content is 0.20%, and preferably 0.25%. A preferred upper-limit for the Mn-content is 0.90%, and preferably 0.80%. In an embodiment the upper-limit for the Mn-content is 0.7%. Mn will increase the strength of the aluminium alloy when in a T4 or T6 temper following solution heat-treatment and rapid cooling. Mn will contribute to maintaining a small grain size in the clad layer(s) providing a better surface appearance and less surface cracks after a forming operation. The presence of Mn increases the anodization quality of the outer-surface of the 6XXX-series layer as it facilitates the beta-AlFeSi phase ($Al_5FeSi$) to alpha-AlFeSi ($Al_8Fe_2Si$) transformation and stabilizes the alpha-AlFeSi phases. The presence of Mn will also favourably increase the corrosion potential of the 6XXX-series aluminium alloy and the amount of Mn added can be tuned to reduce and to optimize the corrosion potential difference between the core alloy and the clad layer(s) depending on the application and thereby enhancing the corrosion resistance of the rolled composite aerospace product.

In an embodiment of the 6xxx-series aluminium alloy the Cu-content is up to 0.10%, preferably up to 0.05%, and more preferably up to 0.03% to enhance the corrosion resistance.

Fe is an effective element for strength improvement and crystal grain refining. A Fe content of less than 0.03% may not produce a sufficient effect, while, on the other hand, a Fe content of more than 0.4% may cause the generation of multiple coarse intermetallic compounds, in particular in the presence of high amounts of Mn, that could reduce the stretch formability and the corrosion resistance of the aluminium alloy. Consequently, the Fe-content is in a range of 0.03% to 0.4%, preferably of 0.1% to 0.3%. In an embodiment the Fe-content is less than 0.25%. In a preferred embodiment the ratio Fe/Mn is less than 1.8 to provide the balance in good corrosion resistance and good anodizing quality.

Cr may be added up to 0.25% to enhance the strength of the aluminium alloy and for crystal grain refining. Preferably it is present up to 0.20% and more preferably up to 0.15%. In an embodiment Cr is among the unavoidable impurities.

Zn can be present up to 0.5% and preferably up to 0.25% without departing from the advantages of the invention. In an embodiment Zn is among the unavoidable impurities.

V may be added up to 0.2% and preferably up to 0.1% without departing from the advantages of the invention. In a preferred embodiment V is among the unavoidable impurities, and preferably only up to 0.02%, and more preferably only up to 0.01%, as it may prevent full recrystallization of the rolled material after solution heat-treatment and quenching. In addition it may form detrimental intermetallic particles in the aluminium alloy.

Zr may be added up to 0.2% and preferably up to 0.1% without departing from the advantages of the invention. In a preferred embodiment Zr is among the unavoidable impurities, and preferably only up to 0.02%, and more preferably only up to 0.01%, as it may prevent full recrystallization of the rolled material after solution heat-treatment and quenching. In addition it may form detrimental intermetallic particles in the aluminium alloy.

Grain refiners such as Ti, $TiB_2$, Ti—C or the like are typically added with a total Ti content of up to 0.15%, preferably up to 0.10%, and more preferably between 0.005% and 0.05%.

Balance is made by aluminium and unavoidable impurities, each <0.05% and total <0.15%.

In an embodiment the 6XXX-series layer is from an aluminium alloy having a composition consisting of, in wt. %, Si 0.3% to 1.0%, Mg 0.3% to 1.1%, Mn 0.04% to 1.0%, Fe 0.03% to 0.4%, Cu up to 0.10%, Cr up to 0.25%, V up to 0.2%, Zr up to 0.2%, Zn up to 0.5%, Ti up to 0.1%, unavoidable impurities each <0.05%, total <0.15%, balance aluminium, and with preferred narrower compositional ranges as herein described and claimed.

In an embodiment the composition of the 6XXX-series aluminium alloy clad layer is tuned or is set such that it has an open potential corrosion value (vs. Standard Calomel Electrode (SCE), also referred to as "corrosion potential") of −710 mV or less (for example, −750 mV) to provide optimum corrosion protection to the 2XXX-series core alloy, and measured in a solution heat-treated and quenched material in a solution of 53 g/L NaCl plus 3 g/L $H_2O_2$ at 25° C. with a 0.1 N calomel electrode. In a preferred embodiment the corrosion potential of the 6XXX-series aluminium alloy clad layer is in a range of −730 mV to −810 mV, measured after SHT and quenching, thus when the key alloying elements are largely in solid solution.

In an embodiment the corrosion potential difference between the 2XXX core layer and the 6XXX-series aluminium alloy clad layer, i.e. in the final temper, is in a range of 30 to 100 mV to provide sufficient corrosion protection from the anodic clad layer to the core layer.

In an embodiment the 2XXX-series core layer is from an aluminium alloy having a composition comprising, in wt. %:
Cu 1.9% to 7.0%, preferably 3.0% to 6.8%, more preferably 3.2% to 4.95%,
Mg 0.30% to 1.8%, preferably 0.35% to 1.8%,
Mn up to 1.2%, preferably 0.2% to 1.2%, more preferably 0.2% to 0.9%,
Si up to 0.40%, preferably up to 0.25%,
Fe up to 0.40%, preferably up to 0.25%,
Cr up to 0.35%, preferably up to 0.10%,
Zn up to 1.0%,
Ti up to 0.15%, preferably 0.01% to 0.10%,
Zr up to 0.25, preferably up to 0.12%,
V up to 0.25%,
Li up to 2.0%
Ag up to 0.80%,
Ni up to 2.5%,
balance being aluminium and impurities. Typically, such impurities are present each <0.05%, total <0.15%.

In another embodiment the 2XXX-series core layer is from an aluminium alloy having a composition comprising, in wt. %:
Cu 1.9% to 7.0%, preferably 3.0% to 6.8%, more preferably 3.2% to 4.95%,
Mg 0.30% to 1.8%, preferably 0.8% to 1.8%,
Mn up to 1.2%, preferably 0.2% to 1.2%, more preferably 0.2 to 0.9%,
Si up to 0.40%, preferably up to 0.25%,
Fe up to 0.40%, preferably up to 0.25%,
Cr up to 0.35%, preferably up to 0.10%,
Zn up to 0.4%,
Ti up to 0.15%, preferably 0.01% to 0.10%,
Zr up to 0.25, preferably up to 0.12%,
V up to 0.25%,
balance being aluminium and impurities. Typically, such impurities are present each <0.05%, total <0.15%.

In preferred embodiment the 2XXX-series core layer is from an AA2X24-series aluminium alloy, wherein X is equal to 0, 1, 2, 3, 4, 5, 6, 7, or 8. A particular preferred aluminium alloy is within the range of AA2024, AA2524, and AA2624.

In an embodiment the 2XXX-series core layer is provided in a T3, T351, T39, T8 or T851 condition.

The 2XXX-series core layer can be provided to a user in a non-solution heat treated condition, such as an "F" temper or an annealed "O" temper, and then formed and solution heat treated and aged by the user to the required condition, e.g. a T3, T351, T39, T8 or T851 temper.

The invention relates also to a method of manufacturing the rolled composite aerospace product of this invention, the method comprising the steps of:
(a) providing an ingot or rolling feedstock of a 2XXX-series aluminium alloy for forming the core layer of the composite aerospace product;
(b) homogenizing the ingot of said 2XXX-series aluminium alloy at a temperature in the range of 400° C. to 505° C. for at least 2 hours;
(c) providing an ingot or rolled clad liner of a 6XXX-series aluminium alloy for forming an outer clad layer on the 2XXX-series core aluminium alloy; optionally two ingots or two rolled clad liners of the 6XXX-series aluminium alloy are provided for forming a clad layer on each side of the 6XXX-series core aluminium alloy;
(d) homogenizing the ingot(s) of the 6XXX-series aluminium alloy at a temperature in the range of at least 480° C. for at least 0.5 hour, and preferably at a temperature in a range of 500° C. to 590° C. prior to hot rolling into a rolled clad liner;
(e) roll bonding of the 6XXX-series aluminium alloy layer(s) to the 2XXX-series core alloy layer to form a roll bonded product, preferably by means of hot rolling and optionally followed by cold rolling;
(f) solution heat-treating the roll bonded product at a temperature in the range of 450° C. to 505° C.;
(g) cooling of the solution heat-treated roll bonded product to below 100° C., and preferably to ambient temperature;
(h) optionally stretching of the solution heat-treated roll bonded product, preferably by means of cold stretching in a range of 0.5% to 8% of its original length, preferably in a range of 0.5% to 6%, more preferably of 0.5% to 4%, and most preferably of 0.5% to 3%; and
(i) ageing of the cooled roll bonded product, by natural ageing and/or artificial ageing. In a preferred embodiment the ageing brings to 2XXX-series core layer to a T3, T351, T39, T8 or T851 temper. The 6XXX-series alloy clad layers will be in T4 temper if only naturally aged, and in a T6 temper when artificially aged.

In an embodiment of the method according to the invention, in a next processing steps the rolled composite aerospace product is formed in a forming process, at ambient temperature or at elevated temperature, into a predetermined shaped product having at least one of a uniaxial curvature or a biaxial curvature.

In an alternative embodiment of the method, after roll bonding of the 6XXX-series aluminium alloy(s) to the 2XXX-series core alloy to form a roll bonded product, preferably by means of hot rolling and optionally followed by cold rolling, the roll bonded product aerospace product of this invention is formed in a forming process, at ambient temperature or at elevated temperature, into a predetermined shaped product having at least one of a uniaxial curvature or a biaxial curvature, followed by a solution heat-treatment and subsequent ageing to a final temper.

The forming can be by a forming operation from the group of a bending operation, roll forming, stretch forming, age creep forming, deep drawing, and high-energy hydroforming, in particular by explosive forming or electrohydraulic forming. The 6XXX-series aluminium alloy used for the rolled composite aerospace product of this invention provides the required bendability, also after natural and/or artificial ageing. It also has the required stretch formability of these forming operations.

In an embodiment the forming operation at elevated temperature is performed at a temperature in a range of 140° C. to 200° C., and preferably the aerospace product is kept at the forming temperature for a time in a range of 1 to 50 hours. To optimise the strength of the 6XXX-series clad layer a forming temperature in a range of 150° C. to 170° C. is being preferred. In a preferred embodiment the forming at elevated temperature is by means of an age creep forming operation. Age creep forming is a process or operation of restraining a component to a specific shape during ageing heat treatment, allowing the component to relieve stresses and creep to contour, for example fuselage shells with a single or double curvature.

In an embodiment it is excluded from the current invention that the rolled composite aerospace product according to this invention after having received a solutioning heat treatment (SHT) and prior to forming into a predetermined shape receives a post-SHT cold working step inducing at least 25% cold work in the rolled composite aerospace product, in particular the cold working comprises cold rolling of the rolled aerospace product to final gauge, as disclosed in patent document US-2014/036699-A1 and incorporated herein by reference.

In an aspect of the invention it relates to the use of the 6XXX-series aluminium alloy as herein described and claimed as a clad layer on one or both surface of a 2XXX-series aluminium alloy rolled aerospace product.

In a further aspect of the invention there is provided a welded structure comprising of a rolled composite aerospace product according to this invention and at least one aluminium alloy stiffening element joined to the rolled composite aerospace product by means of riveting or a welding operation.

In yet a further aspect of the invention it relates to a welded structural member of an aircraft comprising of a rolled composite aerospace product according to this invention and at least one aluminium alloy stiffening element, preferably a stringer, joined to the rolled composite aerospace product by means of riveting or a welding operation, for example by means of laser beam welding or by friction stir welding. It also relates to welded fuselage structures whereby the fuselage panels are joined to each other by means of laser beam welding ("LBW") or friction stir welding ("FSW"), e.g. by means of butt welds.

The invention also comprises an aircraft or spacecraft, the fuselage of which is wholly or partially constructed out of the rolled composite aerospace product according to this invention, which may be incorporated into various structural portions of the aircraft. For example, the various disclosed embodiments may be used to form structural portions in the wing assemblies and/or structural portions in the tail assembly (empennage). The aircraft is generally representative of commercial passenger or freight aircraft. In alternative embodiments, the present invention may also be incorporated into flight vehicles of other types. Examples of such flight vehicles included manned or unmanned military aircraft, rotary wing aircraft, or even ballistic flight vehicles.

The invention rolled composite aerospace product can be shaped into a member for an airplane, such as a fuselage component or panel, or such as a wing component or panel, and the airplane can utilize the advantage of the invention as described. The shaping referred to can include bending, stretch forming, machining and other shaping operations known in the art for shaping panels or other members for aircraft, aerospace or other vehicles. Forming involving bending or other plastic deformation can be performed at room temperature or at elevated temperatures.

DESCRIPTION OF THE DRAWINGS

The invention shall also be described with reference to the appended drawing, in which

FIG. 1 illustrates the embodiment of a rolled composite aerospace product 10 having a three-layered structure of a 2XXX-series core alloy layer 20 having on each side a clad layer 30 of a 6XXX-series aluminium alloy as herein set forth and claimed.

FIG. 2 is a schematic flow schedule of several embodiments of the process of this invention to manufacture a rolled composite aerospace product. In process step 1 an ingot is cast of a 2XXX-series alloy forming the core alloy of the composite aerospace product, which optionally can be scalped in step 2 to remove segregation zones near the as-cast surface of the rolling ingot and to increase product flatness. In process step 3 the rolling ingot is homogenized. In parallel in process step 4 an ingot is cast of a 6XXX-series alloy for forming at least one clad layer on a surface of the core alloy of the composite aerospace product, and optionally on both faces of the core alloy. Also this ingot optionally can be scalped in step 5. In process step 6 the 6XXX-series alloy is homogenized, and subsequently in process step 7 hot rolled to form liner plate(s) as the clad layer is usually much thinner than the core. In process step 8 the 2XXX core alloy and a 6XXX liner plate on one or both sides of the core alloy are roll bonded, preferably by means of hot rolling. Depending on the desired final gauge, the roll bonded product can be cold rolled in process step 9 to final gauge, for example to a sheet product or a thin gauge plate product. In a process step 10 the rolled aerospace product is solution heat treated, next cooled in process step 11, and preferably stretched in process step 12.

Figure 1:
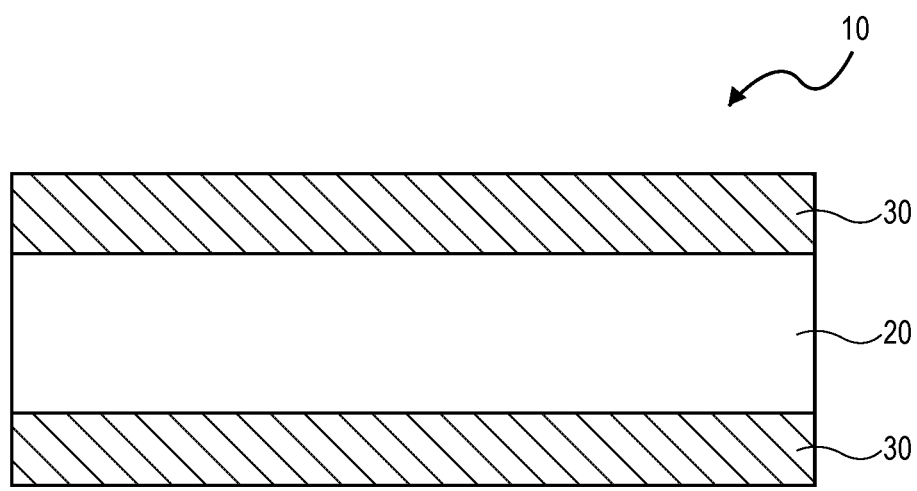
FIG. 1 is a schematic diagram showing embodiments of the invention.
Figure 2:
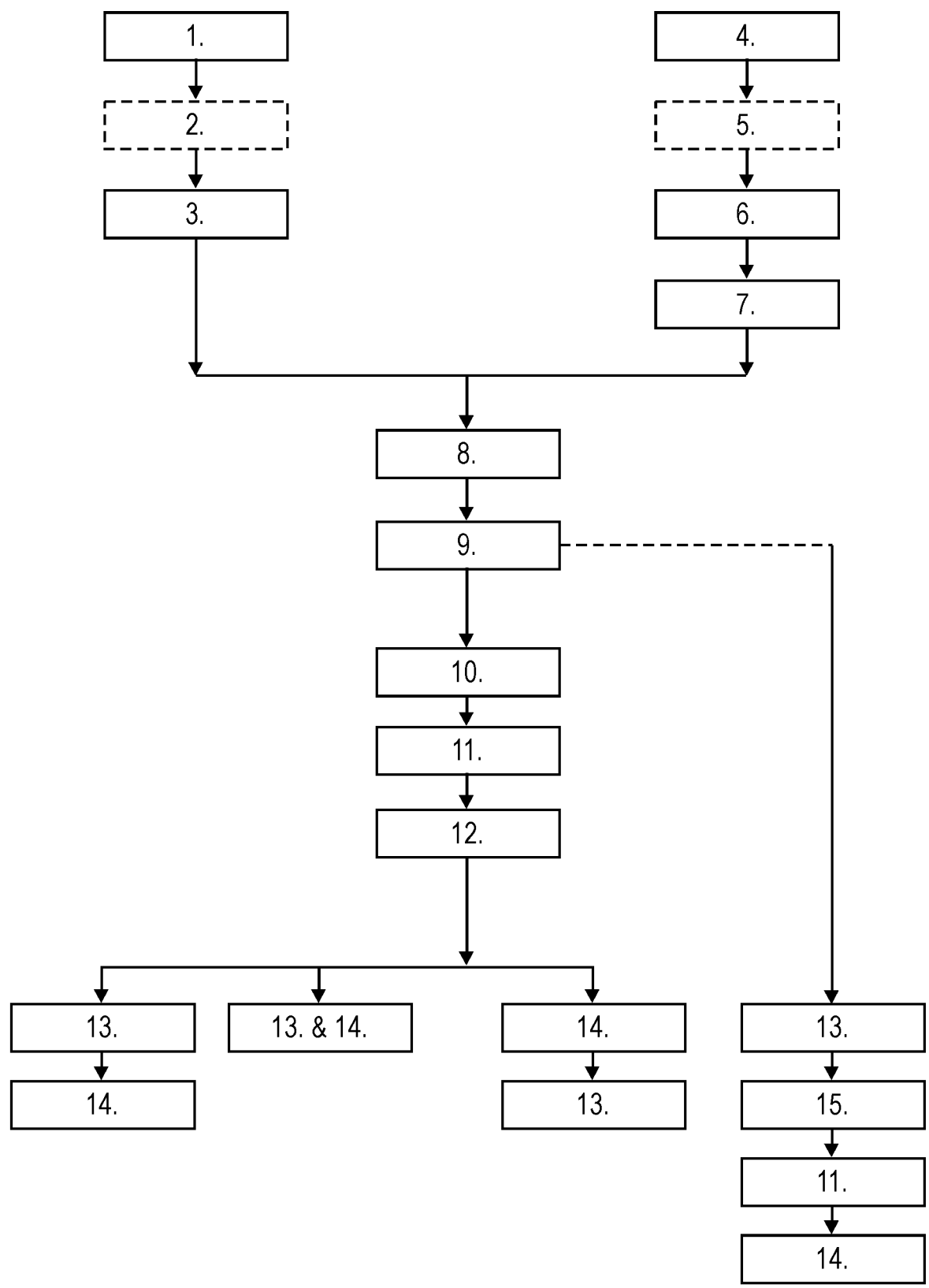
FIG. 2 is a schematic flow schedule of several embodiments of the process to manufacture a rolled composite aerospace product according to this invention.

In an embodiment the cooled product is formed in forming process 13 and ageing, i.e. natural or artificial ageing, in process step 14 to final temper, e.g. a T3 or T8 temper.

In an embodiment the forming process 13 and the ageing of process step 14 can be combined, for example the forming operation is performed at a temperature in a range of 140° C. to 200° C., and preferably for a time in a range of 1 to 50 hours, such that also artificial ageing of both the 2XXX-series core and the 6XXX-series clad layer(s) occurs.

In an embodiment the cooled product is aged in process step 14, i.e. natural or artificial ageing, to a desired temper, and subsequently formed in a forming process 13 into a formed product of predetermined shape.

In an alternative embodiment after rolling bonding of the 2XXX-series core and the 6XXX-series clad layer(s) to final gauge, the rolled product is formed in a forming process 13 into a predetermined shape, solution heat treated of the formed product in process step 15 and cooled in process step 11 and followed by ageing, i.e. natural or artificial ageing, in process step 14 to final temper, e.g. a T3 or T8 temper.

The invention is not limited to the embodiments described before, and which may be varied widely within the scope of the invention as defined by the appending claims.

The invention claimed is:

1. A rolled composite aerospace product comprising a 2XXX-series core layer and a 6XXX-series aluminium alloy clad layer coupled to at least one surface of the 2XXX-series core layer, wherein the 6XXX-series aluminium alloy comprises, in wt. %, Si 0.3% to 1.0%, Mg 0.3% to 1.1%, Mn 0.04% to 1.0%, Fe 0.03% to 0.4%, Cu up to 0.10%, Cr up to 0.25%, V up to 0.2%, Zr up to 0.2%, Zn up to 0.5%, Ti up to 0.1%, unavoidable impurities each <0.05%, total <0.15%, balance aluminium, wherein the 2XXX-series core layer is in a T3, T351, T39, T8 or T851 temper; and wherein the 6XXX-series aluminium alloy clad layer is in a T4 or T6 temper.

2. The rolled composite aerospace product according to claim 1, wherein the 6XXX-series aluminium alloy has a Si-content in a range of 0.4% to 0.9%.

3. The rolled composite aerospace product according to claim 1, wherein the 6XXX-series aluminium alloy has a Mg-content in a range of 0.40% to 0.90%.

4. The rolled composite aerospace product according to claim 1, wherein the 6XXX-series aluminium alloy has a Mn-content in a range of 0.25% to 1.0%.

5. The rolled composite aerospace product according to claim 1, wherein the 6XXX-series aluminium alloy clad layer is coupled by means of roll bonding to the at least one surface of the 2XXX-series core layer.

6. The rolled composite aerospace product according to claim 1, wherein the 6XXX-series aluminium alloy clad layer has a thickness in the range of 1% to 20%, and preferably 1% to 10%, of the total thickness of the rolled composite aerospace product.

7. The rolled composite aerospace product according to claim 1, consisting of a 2XXX-series core layer and a 6XXX-series aluminium alloy clad layer coupled to one surface of the 2XXX-series core layer.

8. The rolled composite aerospace product according to claim 1, consisting of a 2XXX-series core layer and a 6XXX-series aluminium alloy clad layer coupled to both surfaces of the 2XXX-series core layer.

9. The rolled composite aerospace product according to claim 1, wherein the 2XXX-series alloy of the core layer has a composition of, in wt. %,
Cu 1.9% to 7.0%,
Mg 0.30% to 1.8%,
Mn up to 1.2%,
Si up to 0.40%,
Fe up to 0.40%,
Cr up to 0.35%,
Zn up to 1.0%,
Ti up to 0.15%,
Zr up to 0.25%,
V up to 0.25%,
Li up to 2.0%,
Ag up to 0.80%,
Ni up to 2.5%,
balance being aluminium and impurities.

10. The rolled composite aerospace product according to claim 1, wherein the 2XXX-series core layer is from the 2×24-series alloy.

11. The rolled composite aerospace product according to claim 1, wherein the rolled composite aerospace product has a total thickness of 0.8 mm to 50.8 mm.

12. The rolled composite aerospace product according to claim 1, wherein the rolled composite aerospace product is a plate product.

13. The rolled composite aerospace product according to claim 1, wherein the rolled composite aerospace product is a sheet product.

14. The rolled composite aerospace product according to claim 1, wherein the rolled composite aerospace product is an aerospace structural part.

15. A method of manufacturing a rolled composite aerospace product according to claim 1, comprising the steps of:
(a) providing an ingot of a 2XXX-series aluminium alloy for forming the core layer of the composite aerospace product;
(b) homogenizing the ingot of the 2XXX-series aluminium alloy at a temperature in the range of 400° C. to 505° C. for at least 2 hours;
(c) providing an ingot or rolled clad liner of a 6XXX-series aluminium alloy for forming an outer clad layer on the 2XXX-series core aluminium alloy;
(d) homogenizing the ingot of the 6XXX-series aluminium alloy at a temperature in the range of at least 480° C., for at least 0.5 hour;
(e) roll bonding the 6XXX-series aluminium alloy to the 2XXX-series core alloy to form a roll bonded product, and optionally followed by cold rolling;
(f) solution heat-treating the roll bonded product at a temperature in the range of 450° C. to 505° C.;
(g) cooling of the solution heat-treated roll bonded product to below 100° C.;
(h) optionally stretching of the solution heat-treated and cooled roll bonded product; and
(i) ageing of the 2XXX-series core alloy of the cooled roll bonded product.

16. The method according to claim 15, wherein the method further comprises forming of the solution heat-treated and cooled roll bonded product, and optionally also being stretched, in a forming process into a predetermined shape product.

17. The method according to claim 15, wherein a forming step (j) is performed after the ageing step (i).

18. The method according to claim 16, wherein the forming step (j) and the ageing step (i) are combined in a forming step at elevated temperature.

* * * * *